United States Patent [19]

Volk

[11] Patent Number: 4,489,634

[45] Date of Patent: Dec. 25, 1984

[54] PORTABLE POWER TOOL TABLE

[76] Inventor: Michael J. Volk, 216 McKeon Rd., Severna Park, Md. 21146

[21] Appl. No.: 402,739

[22] Filed: Jul. 28, 1982

[51] Int. Cl.³ .............................................. B27B 21/00
[52] U.S. Cl. ..................................... 83/522; 83/471.2; 83/574; 83/581; 83/828
[58] Field of Search .................... 144/1 E, 1 F, 136 C, 144/136 D, 134 D; 83/574, 471.2, 471.3, 522, 827, 828, 829, 585, 589, 745, 781, 776, 581

[56] References Cited

U.S. PATENT DOCUMENTS

| | | | |
|---|---|---|---|
| 2,683,489 | 7/1954 | Jackman | 83/485 |
| 2,818,892 | 1/1958 | Price | 83/574 X |
| 3,379,228 | 4/1968 | Carlberg et al. | 83/471.2 |
| 3,741,063 | 6/1973 | Bretthauer | 83/745 |
| 4,215,731 | 8/1980 | Maynard | 144/134 D |

FOREIGN PATENT DOCUMENTS 954663  6/1949  France .................................. 83/455

Primary Examiner—James M. Melster
Attorney, Agent, or Firm—Brady, O'Boyle & Gates

[57] ABSTRACT

A table for supporting and guiding diverse portable power tools with precision and safety is disclosed. In one mode of use with a sabre saw, adjustable guide rails for the saw have free-floating engagement with locator posts on the table and rest directly on the workpiece which is being cut. The guide rails at one end can be raised or lowered for precise leveling and locked in the chosen position. Very smooth cutting by the sabre saw is enabled without chattering of the workpiece. In another form of the table there is a second mode of use with a circular saw or router, the guide rails are supported at a fixed height atop the locator posts and above the top surface of the workpiece resting on the table. A workpiece protractor guide on the table enables various cutting angles. Precision cutting of cove molding by a sabre or circular saw is possible by proper angular adjustment of the protractor guide and saw blade. The sabre saw can also be used in a ripping mode across the guide rails when the latter are supported at a fixed height atop the locator posts.

12 Claims, 11 Drawing Figures

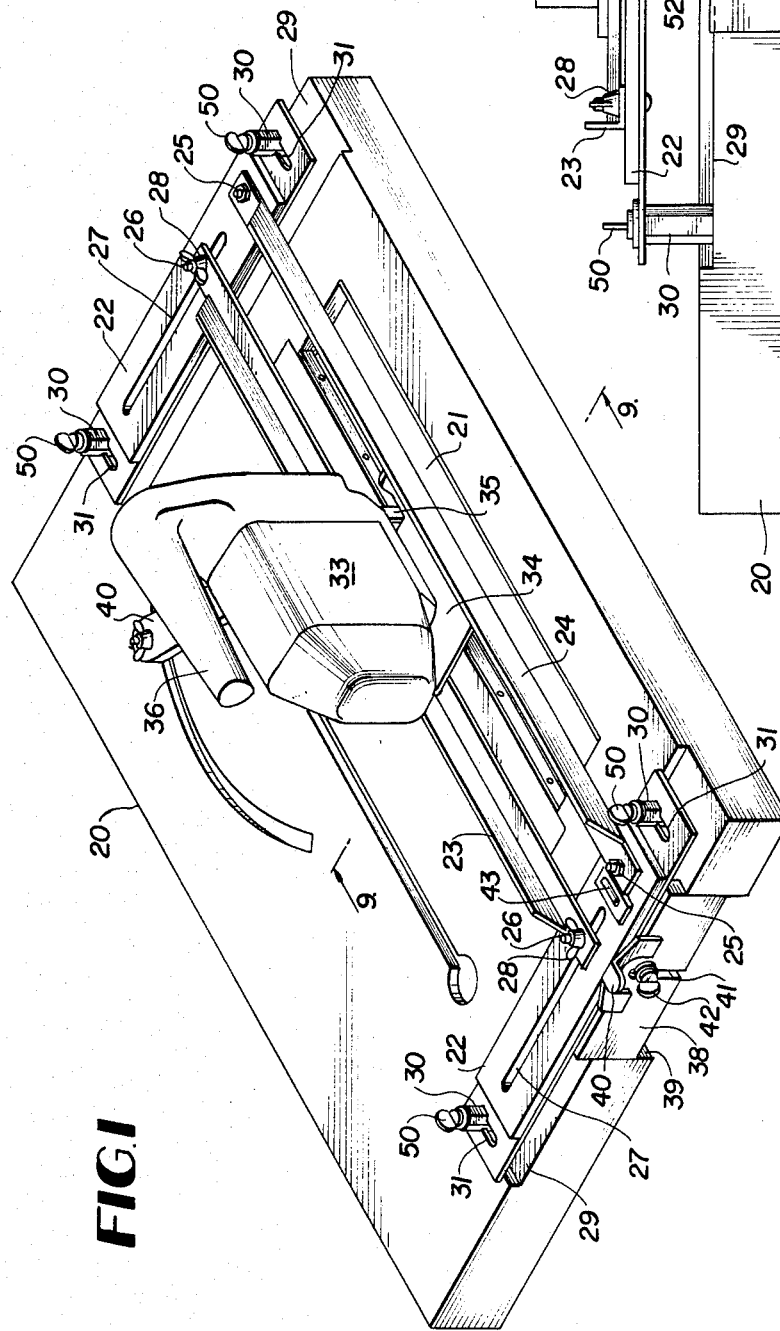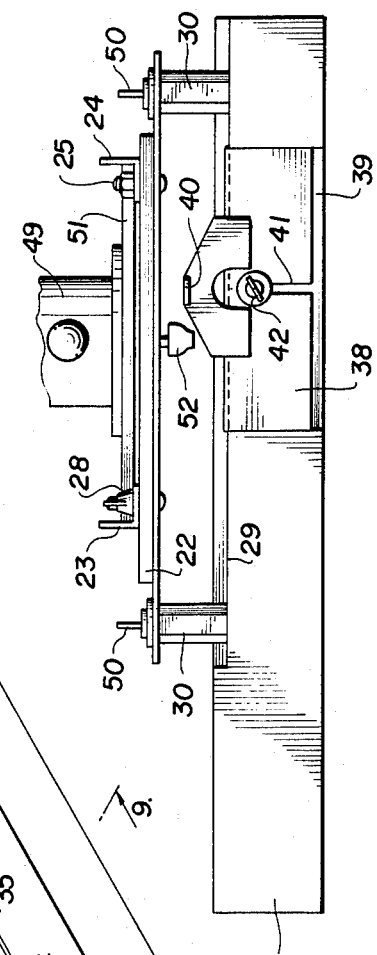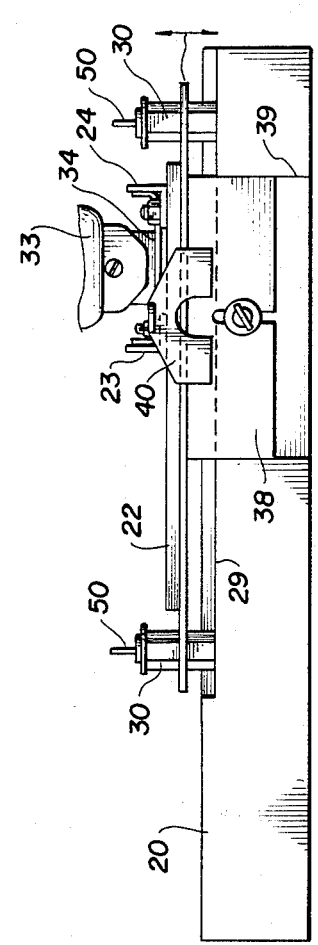

FIG.3
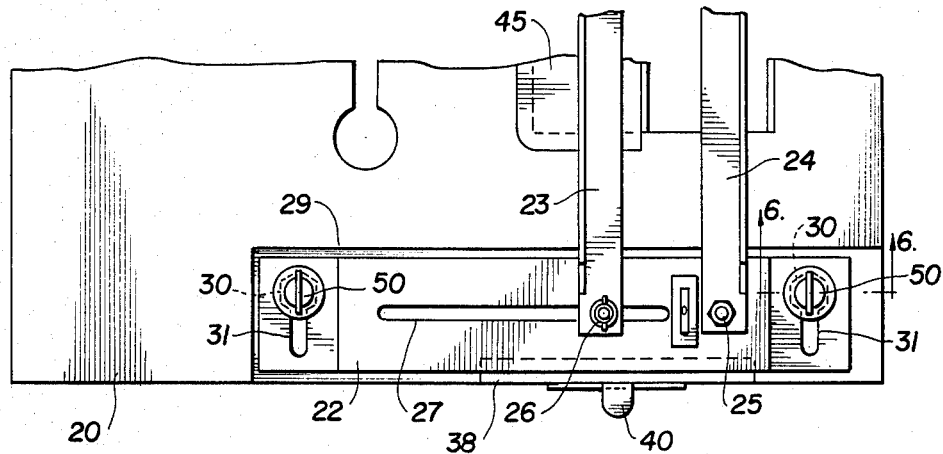
FIG.5
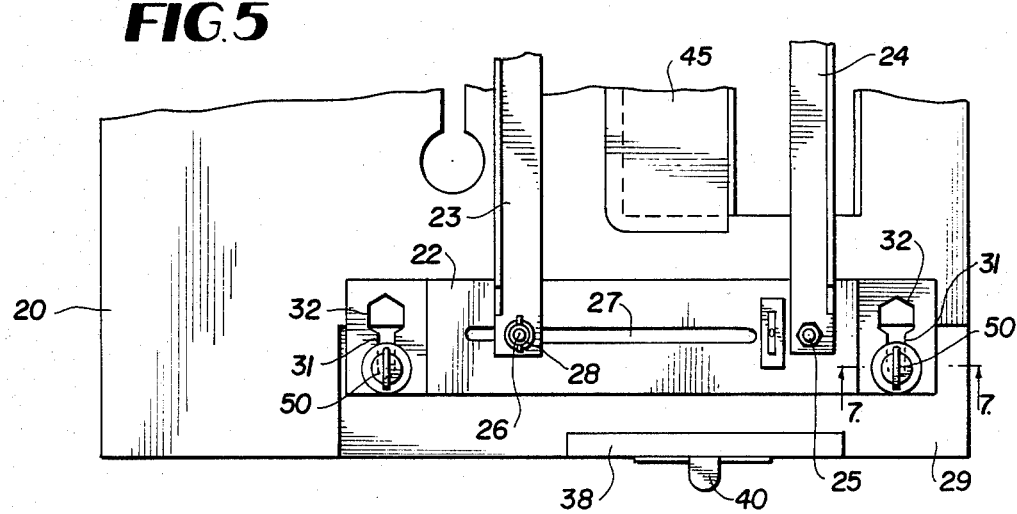
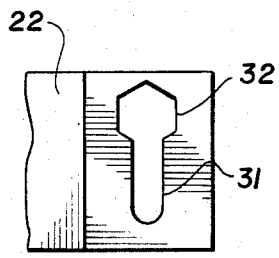
FIG.8
FIG.6
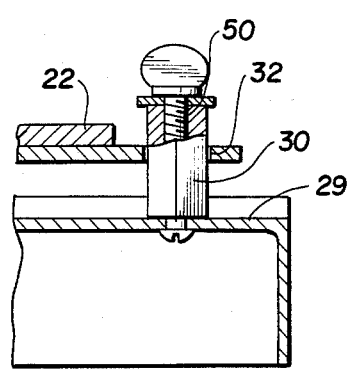
FIG.7
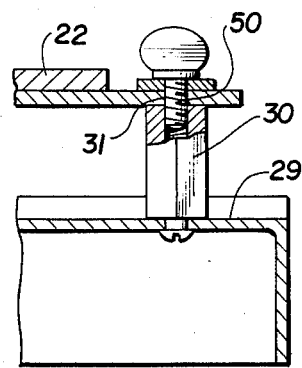

PORTABLE POWER TOOL TABLE

BACKGROUND OF THE INVENTION

The general objective of this invention is to improve the diversity and utility, as well as the convenience of use, safety and simplicity of operation of a portable power tool table of the general type shown in U.S. Pat. No. 4,320,678.

More particularly, it is one of the objectives of the invention to enable the use of a sabre saw in various cutting modes, including compound angle cutting of workpieces without the possibility of injuring or severing the fingers, as can occur in some cases where the base of the sabre saw is supported and guided at a fixed height above the table and workpiece.

Another object is to provide a table and adjustable guide rail structure which permits use of a sabre saw in various ways so that all of its operational capabilities are taken advantage of, namely, straight and angle cutting with the saw blade in a vertical plane, compound angle cutting with the blade tilted relative to the vertical, cutting of cove molding in cooperation with a protractor on the table, and rip sawing across the axis of the guide rail means.

The essence of the invention resides in the provision of two distinct modes of support or use of the adjustable guide rail assembly relative to the underlying table. In one mode of use, the guide rail assembly is held at a fixed elevation above the table and above any workpiece resting on the table. In this mode, the guide rail assembly can support a portable circular saw or router and may also support a sabre saw for ripping lumber with the saw blade disposed in a plane across the longitudinal axis of the guide rail assembly. In another mode of operation, the guide rail assembly is floatingly supported while being restrained against lateral or longitudinal displacement. It rests on the top face of any workpiece on the table within the thickness range which the device can accommodate. In this second mode of use, the guide rail assembly supports and guides a sabre saw and facilitates the full range of utility of such saw including the making of compound angle cuts and the cutting of cove molding with precision and smoothness, in cooperation with a protractor attachment provided on the table. A simplified version of the table provides only this second mode of use.

In the two modes of use of the adjustable guide rail assembly, mounting plates for the assembly at its opposite ends have keyhole slots whose enlarged ends slidably engage locator posts rising from the table to facilitate the floating mode of use. When used at a fixed height above the table, the guide rail assembly mounting plates rest on the tops of the locator posts with the narrow ends of the keyhole slots shifted to engage the shanks of clamping or locking screws.

One end of the guide rail assembly can be raised and lowered and locked in a selected adjusted position to level the guide rails with precision so as to further enhance smooth chatter-free operation of a sabre saw.

Other features and advantages of the invention will become apparent during the course of the following detailed description.

BRIEF DESCRIPTION OF THE DRAWINGS

FIG. 1 is a perspective view of a portable power tool table according to the invention showing one mode of use thereof.

FIG. 2 is an end elevation of the table, parts broken away.

FIG. 3 is a fragmentary plan view of the table.

FIG. 4 is an end elevation, similar to FIG. 2, showing a second mode of use or operation.

FIG. 5 is a fragmentary plan view of the device as shown in FIG. 4.

FIG. 6 is an enlarged vertical section taken on line 6—6 of FIG. 3.

FIG. 7 is a similar section taken on line 7—7 of FIG. 5.

FIG. 8 is an enlarged fragmentary plan view of a guide rail assembly mounting plate showing a keyhole slot.

DETAILED DESCRIPTION

Figure 9:
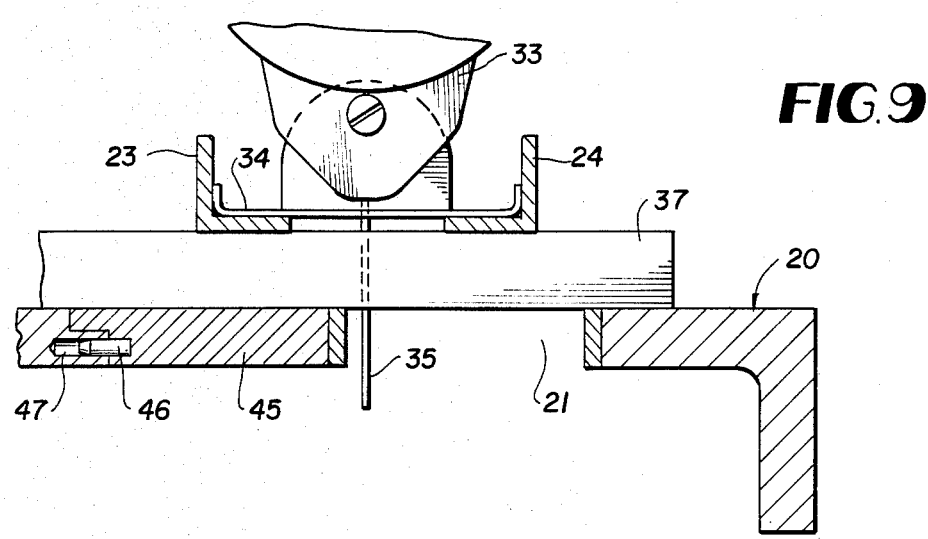
FIG. 9 is an enlarged fragmentary vertical section taken on line 9—9 of FIG. 1.

Referring to the drawings in detail wherein like numerals designate like parts, the numeral 20 designates a table having formed therein a longitudinal passageway 21 for power tool blades, such as saw blades.

Mounted on the table 20 adjustably is a power tool guide rail assembly consisting of two opposite end mounting plates 22 and interconnecting longitudinal parallel guide rails 23 and 24 in the form of opposing channel bars. The guide rail 24 has its opposite ends fixed to the tops of mounting plates 22 by bolts 25. The opposite ends of guide rail 23 are connected with mounting plates 22 by bolts 26 engaging through lateral adjusting slots 27 of the mounting plates and carrying clamping wing nuts 28. By this means, the guide rail 23 is rendered readily adjustable laterally relative to fixed guide rail 24 which remains in one position.

The two mounting plates 22 of the guide rail assembly rest on recessed faces 29 only when the guide rail assembly is in a full down non-use position, as during storage or shipment. During two possible modes of use, soon to be described, the plates 22 are above the recessed surfaces 29 and above the top face of the table 20.

Two pairs of spaced vertical locator and guide posts 30 for the plates 22 rise from the recessed surface 29 and are fixed thereto. The posts 30 can be hexagonal in cross section, as shown, or may have other cross sectional shapes, such as square or round. Near their opposite ends, the mounting plates 22 have keyhole slots 31 formed therein. Enlarged openings 32 at corresponding ends of the keyhole slots in the two mounting plates 22 have the same cross sectional shapes as the posts 30 and can engage over the posts slidingly with some small clearance space existing between the posts 30 and the enlarged openings 32. To enable the posts 30 to enter the enlarged openings 32, it is necessary to shift the entire guide rail assembly longitudinally on the table 20 to position the openings 32 in proper registration with the vertical posts 30. At such time, the mounting plates 22 will also register with the two recessed surfaces 29, as best shown in FIG. 3.

This construction facilitates one mode of use of the guide rail assembly on the table 20 in conjunction with a portable sabre saw 33 having a base plate 34 which rests slidably upon and between the two parallel guide rails 23 and 24. The sabre saw also includes a depending cantilevered saw blade 35 and an operating handle 36. The sabre saw is conventional in construction. The guide rail 23 is adjusted laterally along the slots 27 to achieve proper spacing and parallelism relative to the fixed rail 24 so as to properly accommodate the base plate 34 guidingly. After proper adjustment, the rail 23 is locked by means of the winged nuts 28.

The two mounting plates 22 are floatingly engaged on the posts 30 and are free to move upwardly or downwardly thereon as indicated by the arrows in FIG. 2 during regular use of the sabre saw. The bottoms of the rails 23 and 24 rest directly on the top face of the workpiece 37 undergoing cutting by the sabre saw as best show in FIGS. 9 and 10, regardless of the thickness of the workpiece within a range of thicknesses which the table can accommodate. The workpiece 37 thus forms the support for the entire guide rail assembly and the sabre saw during regular use of the latter.

To allow precise leveling of the guide rails 23, 24, and particularly to enable the two rails to rest solidly on the top face of the workpiece 37 when such top face may not be truly level, a vertically sliding adjusting plate 38 for one end of the guide rail assembly is disposed in a vertical recess 39 formed in one end face of the table 20. The upper edge of the adjusting plate 38 lies beneath the outer edge portion of the adjacent mounting plate 22. The adjusting plate 38 is equipped with a handle 40 for convenience, and is provided with a vertical slot 41 near its center receiving a relatively fixed locking screw 42 threadedly engaged with the table 20. Preferably, the adjacent mounting plate 22 carries a small bubble level 43 to assist the user in determining the degree of levelness of the guide rail assembly. The vertical adjusting plate 38 is moved upwardly or downwardly a slight amount and then locked by means of the screw 42 after the bottoms of the rails 23 and 24 are in full contact with the top face of any particular workpiece 37.

Sufficient clearance or play is present between the posts 30 and guide openings 32 to allow the described vertical adjustment of one end of the assembly without binding. Throughout the full range of adjustment afforded by the plate 38, the mounting plates 22 are freely floating engaged with the posts 30 in the sabre saw mode of use of the device. The small clearance space between the posts and the enlarged openings 32 need only be held to close tolerance with respect to one pair of the posts 30, consisting of one post 30 at opposite ends of the guide rail assembly. The enlarged openings 32 for the other pair of posts can be somewhat larger so close tolerance need only be maintained for one pair of openings 32 since only one pair is required to restrain the floating guide rail assembly against lateral or longitudinal displacement.

A conventional adjustable protractor 44 is provided on the table 20 to position workpieces at any desired angle relative to the guide rails 23 and 24 and saw blade 35. When the saw blade 35 is operating in a vertical plane, a table insert panel 45 having locator pins 46 at one edge thereof can be placed in the passageway 21 to reduce the width thereof and lend greater support to the workpiece 37. The table 20 has a corresponding number of pilot openings 47 along one edge of the passageway 21 to receive the pins 46, as shown in FIG. 9.

Figure 10:
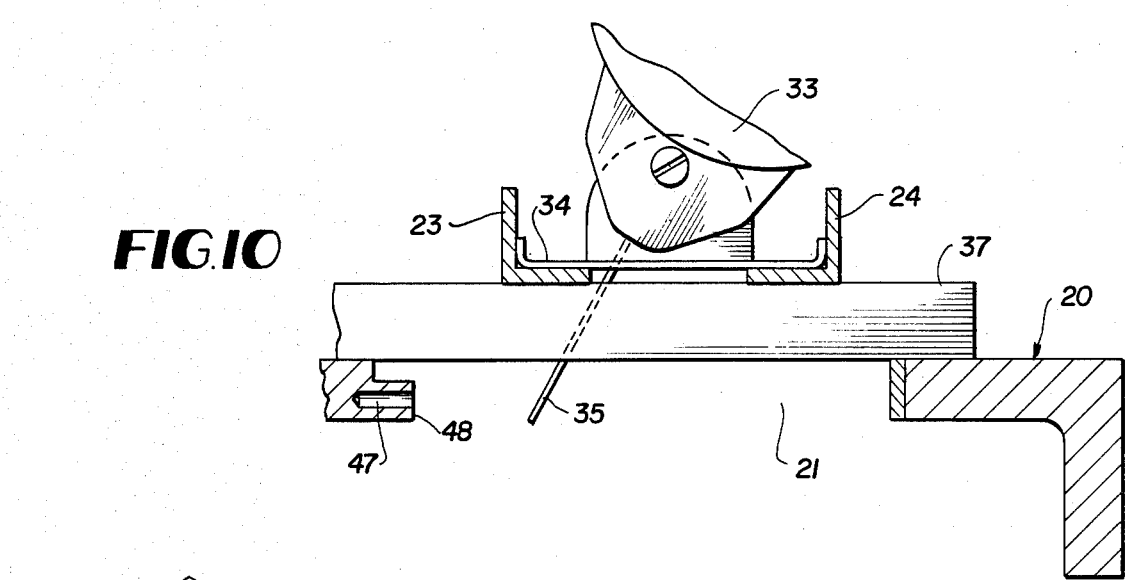
FIG. 10 is a similar section showing a sabre saw blade adjusted at an angle to the vertical with a table insert panel removed.
Figure 11:
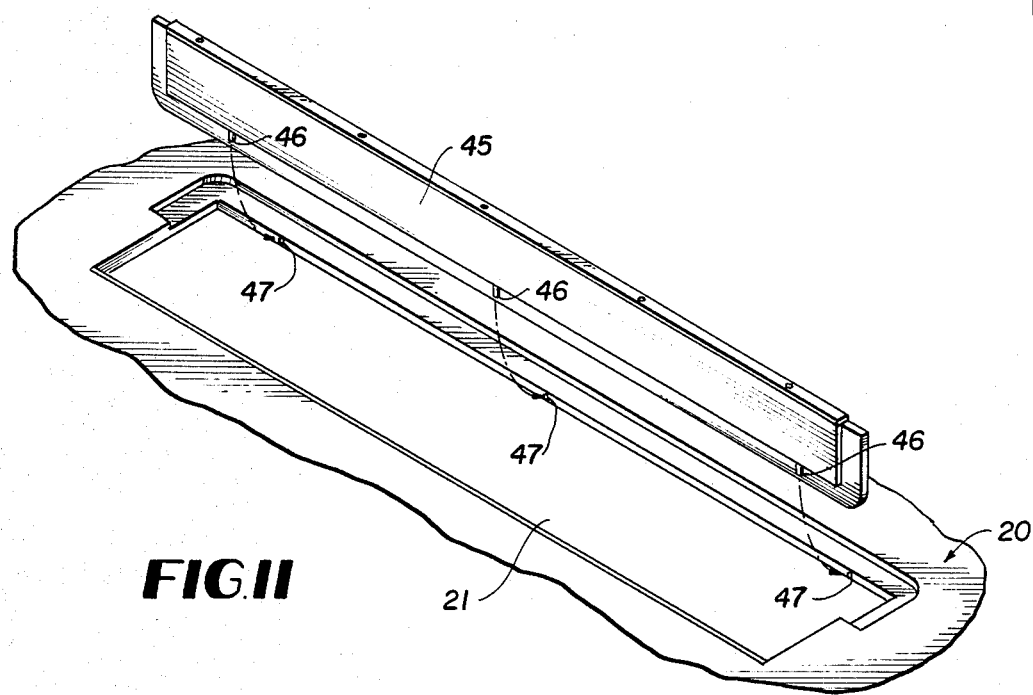
FIG. 11 is an exploded perspective view of a table insert panel.

When the sabre saw 35 is operating at an angle to the vertical, FIG. 10, the insert panel 45 is removed to provide adequate clearance for the blade. It may be noted with reference to FIG. 10 that the mode of operation wherein the guide rails 23, 24 float on the posts 30 and rest on the workpiece 37 at all times is always safe for the operator. It is not possible for the operator or user to insert his or her fingers into the path of movement of the blade 35 in the region between the rail 23 and the underlying edge 48 of the saw table. The presence of the workpiece 37 prevents this. In the prior art, in some cases, where the sabre saw guide rails are held at a fixed elevation above the table and above a thin workpiece, it is possible to place the fingers in contact with the saw blade and serious injury can result.

In another mode of use, the saw table is employed with a router 49, as shown in FIG. 4, or with a portable circular saw, not shown. During such usage, the guide rail assembly composed of mounting plates 22 and rails 23 and 24 is bodily shifted longitudinally of the table 20 after the mounting plates are raised to the tops of the posts 30. In such shifting, clamping screws 50 engaged in threaded openings in the tops of the posts enter the narrow portions of keyhole slots 31 and the enlarged openings 32 move out of registration with the posts, FIG. 5. The mounting plates 22 also move out of registration with the recessed surfaces 29. The opposite end portions of the plates 22 rest solidly at a fixed elevation atop posts 30 and are locked against movement by the clamping screws 50.

In such elevated fixed position, the adjustable guide rail 23 is positioned to accommodate the base plate 51 of router 49 or of a circular saw accessory base guidingly between the two guide rails. The contoured cutter 52 of the router is positioned somewhat above the top of table 20. The vertical adjusting plate 38 is not employed when the guide rail assembly is at a fixed elevation on the posts 30. Workpieces, not shown, of varying thickness within the limits which the table can accommodate are now placed on the table 20 below the guide rails 23 and 24 and are fed into the router in the usual manner.

Where a circular saw, not shown, is used, lumber can be placed against the protractor 40 in any adjusted position of the latter and the saw is moved along the guide rails 23 and 24 to cut the lumber or other workpieces while the guide rail assembly is fixed to the tops of the posts 30.

In this mode of use, the invention has two additional capabilities. A sabre saw can be employed to rip lumber in the manner fully described in copending U.S. application Ser. No. 06/204,065, filed Nov. 4, 1980, Michael J. Volk, inventor. In such ripping operation, the base plate of the sabre saw is turned ninety degrees from the position shown in FIG. 1 and the saw blade 35 cuts at right angles to the rails 23 and 24 as the lumber is fed across the table 20 into the blade.

The other capability is when a router 49 is used, instead of clamping the router base plate 51 to the rails 23 and 24 and feeding the workpiece into the router bit or cutter 52, as previously described, the workpiece can be placed against the protractor 40 in any adjusted position and the router moved along the guide rails 23 and 24 relative to the workpiece to cut a groove, rabbet, dovetail slot, or the like, in the workpiece.

An important capability of the saw table with the guide rail assembly in the floating mode on the posts 30, is that a sabre saw can also be used to accurately compound cut cove molding, without the necessity for a special cove molding rest on the table 20. This can be done by adjusting the angle of the protractor workpiece guide 40 at approximately 32 degrees to the guide rail axis and adjusting the sabre saw blade 35 to an angle of thirty degrees to the vertical, in the manner as shown in FIG. 10. The cove molding is simply placed on the table 20 and held against protractor 40 during the cutting operation, and the weight of the rails 23 and 24 on top of the cove molding being cut holds it down and prevents any chatter thereof during the cutting operation to thus provide a clean and extremely smooth and accurate cut. Along with the stated positionings, a selection of one of four possible cove molding placements is used that provides all cuts needed for outer and inner corners and splice cove molding construction. The sabre saw can be advanced along the rails 23 and 24 by light finger pressure. The same principal may also be used for cutting cove molding with a circular saw.

A simplified version of the table provides the guide rail assembly only in the floating mode of use, with no provision for locking the assembly at a fixed elevation above the table on the tops of the guide posts 30. Since all of the structure for this form of the invention is disclosed in the drawings for the table that provides two modes of use, no drawings for the simplified version are believed necessary.

In the simplified version only a single pair of guide posts 30 are provided for the plates 22, preferably the pair shown adjacent the opposite ends of adjustable rail 23, although only the pair of posts 30 shown adjacent the fixed rail 24 could just as easily be used. The two mounting plates 22 of the guide rail assembly are each provided with an enlarged opening 32 of the same cross sectional shape as the respective guide posts 30, so the two mounting plates 22 can engage over the posts slidingly with only a small clearance space existing between the posts 30 and the enlarged openings 32. This prevents lateral and longitudinal displacement of the guide rail assembly while allowing it to freely move up and down on the guide posts. In this form of the table, the mounting plates 22 are not provided with keyhole slots 31 extending from the two openings 32, since there are only two guide posts 30 and the guide rail assembly cannot be fixed at the top of those posts. The tops of the two posts 30 may be provided with enlarged head portions or with screws 50 and washers having a diameter greater than the diameters of the openings 32 for retaining the mounting plates 22 of the guide rail assembly on the two posts.

The remaining structure of the guide rail assembly is the same as shown and described in connection with the first described form of the invention, and the table 20 is also provided with the same adjusting plate structure 38 in a vertical recess 39 in one end face of the table, and the associated elements 40, 41, 42 and 43.

This simplified table structure with a guide rail assembly always in a floating mode is for use with a portable circular saw or a sabre saw that rests slidably on and between the rails 23 and 24.

In use the bottoms of the rails 23 and 24 rest directly on the top face of the workpiece 37 undergoing cutting so that the workpiece forms one support for the guide rail assembly. The adjusting plate 38 which forms the other support for the guide rail assembly is moved upwardly or downwardly in slot 39 by means of handle 40, which slides one end of the assembly up or down the adjacent guide post 30, and when bubble level 43 indicates the end of the guide rail assembly is level with the top surface of the workpiece adjusting plate 38 is locked in place by screw 42. The saw is then moved along the rails to make the proper cut on the workpiece.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A table for portable power tools comprising a table body portion having a workpiece support surface, a guide rail assembly comprising end mounting members and a pair of guide rails for the support and guidance of power tools, at least one guide rail being laterally adjustable relative to the other guide rail, means on the table body portion near opposite ends thereof and adjacent to said mounting members to, in one mode of use of the table, floatingly support the mounting members and the guide rail assembly for unrestrained vertical movement while restraining the mounting members and guide rail assembly against lateral and longitudinal movement relative to the workpiece support surface, support surfaces on said means on the table body portion at a fixed elevation above the workpiece support surface, and in a second mode of use of the table, said mounting members engaging said support surfaces on said means on the table body portion to support said mounting members, and guide rail assembly at a fixed elevation above the workpiece support surface restraining the mounting members and guide rail assembly from vertical movement and against lateral and longitudinal movement relative to the workpiece support surface.

2. A table for portable power tools as defined in claim 17, and said means on the table body portion comprising at least a pair of guide posts rising vertically from the table body portion near its opposite ends and adjacent to said mounting members, and the mounting members each having at least one guide opening adapted to register with and receive said posts movably.

3. A table for portable power tools as defined in claim 1, and said means on the table body portion comprising spaced posts rising vertically from the table body portion near its opposite ends and adjacent ot said mounting members, and the mounting members each having spaced guide openings adapted to register with the and receive said posts movably in said one mode of use of the table and having support surfaces adjacent to the guide openings adapted to rest on the coacting support surfaces on the tops of said posts in said second mode of use of the table.

4. A table for portable power tools as defined in claim 1, and slide means on the table body portion to vertically adjust one mounting member and the corresponding end of the guide rail assembly to a selected vertical height above the workpiece support surface below which the one-mounting member and the corresponding end of the guide rail assembly cannot vertically move relative to the workpiece support surface during said one mode of use of the table.

5. A table for portable power tools as defined in claim 3, and the mounting members each having spaced keyhole slots defining said guide openings and support surfaces, and locking devices for the mounting members on said posts engageable within the keyhole slots in said second mode of use of the table.

6. A table for portable power tools as defined in claim 5, and the keyhole slots having their longitudinal axes parallel to the axes of the guide rails, and the locking devices comprising locking screws threadedly engaging the tops of the posts and being engageable within the narrow portions of the keyhole slots in said second mode of use of the table, said posts being engageable in the enlarged portions of the keyhole slots in said one mode of use of the table.

7. A table for portable power tools as defined in claim 1, and said table body portion having a passageway formed therethrough for power tool blades below said guide rails, and a removable insert panel engageable with the table body portion at one side of the passageway to reduce the width of the passageway.

8. A table for portable power tools comprising a table body portion having a workpiece support surface, a guide rail assembly comprising end mounting members and a pair of guide rails for the support and guidance of power tools, at least one guide rail being laterally adjustable relative to the other guide rail, means on the table body portion near opposite ends thereof and adjacent to said mounting members to floatingly support the nounting members and the guide rail assembly for unrestrained vertical movement while restraining the mounting members and guide rail assembly against lateral and longitudinal movement relative to the workpiece support surface, a vertical adjusting slide on the table body portion beneath one mounting member to vertically adjust said one mounting member and the corresponding end of the guide rail assembly relative to the workpiece support surface independently of the other mounting member, and means to lock said slide in a selected adjusted vertical position.

9. A table for portable power tools as defined in claim 8, and a bubble level connected on said one mounting member parallel with said pair of guide rails for assisting the leveling of said guide rail assembly with said vertical adjusting slide.

10. A table for portable power tools as defined in claim 8, and said slide having a top supporting edge movable into abutment with the bottom of said one mounting member for vertically raising and lowering said corresponding end of the guide rail assembly relative to said workpiece support surface.

11. A table for portable power tools as defined in claim 8, and guide means on one end face of said table body portion adjacent said one mounting member, and said vertical adjusting slide connected for vertical movement in said guide means.

12. A table for portable power tools comprising a table body portion having workpiece support surface, a guide rail assembly comprising end mounting members and a pair of guide rails for the support and guidance of the power tools, at least one guide rail being laterally adjustable relative to the other guide rail, at least a pair of guide posts rising vertically from the table body portion near opposite ends thereof and adjacent to said mounting members, said mounting members each having at least one guide opening adapted to register with and receive said posts movably to floatingly support the mounting members and the guide rail assembly for unrestrained vertical movement while restraining the mounting members and guide rail assembly against lateral and longitudinal movement relative to the workpiece support surface, and stop elements at the tops of said guide posts to limit upward movement of the mounting members.

* * * * *